Patented Apr. 23, 1929.

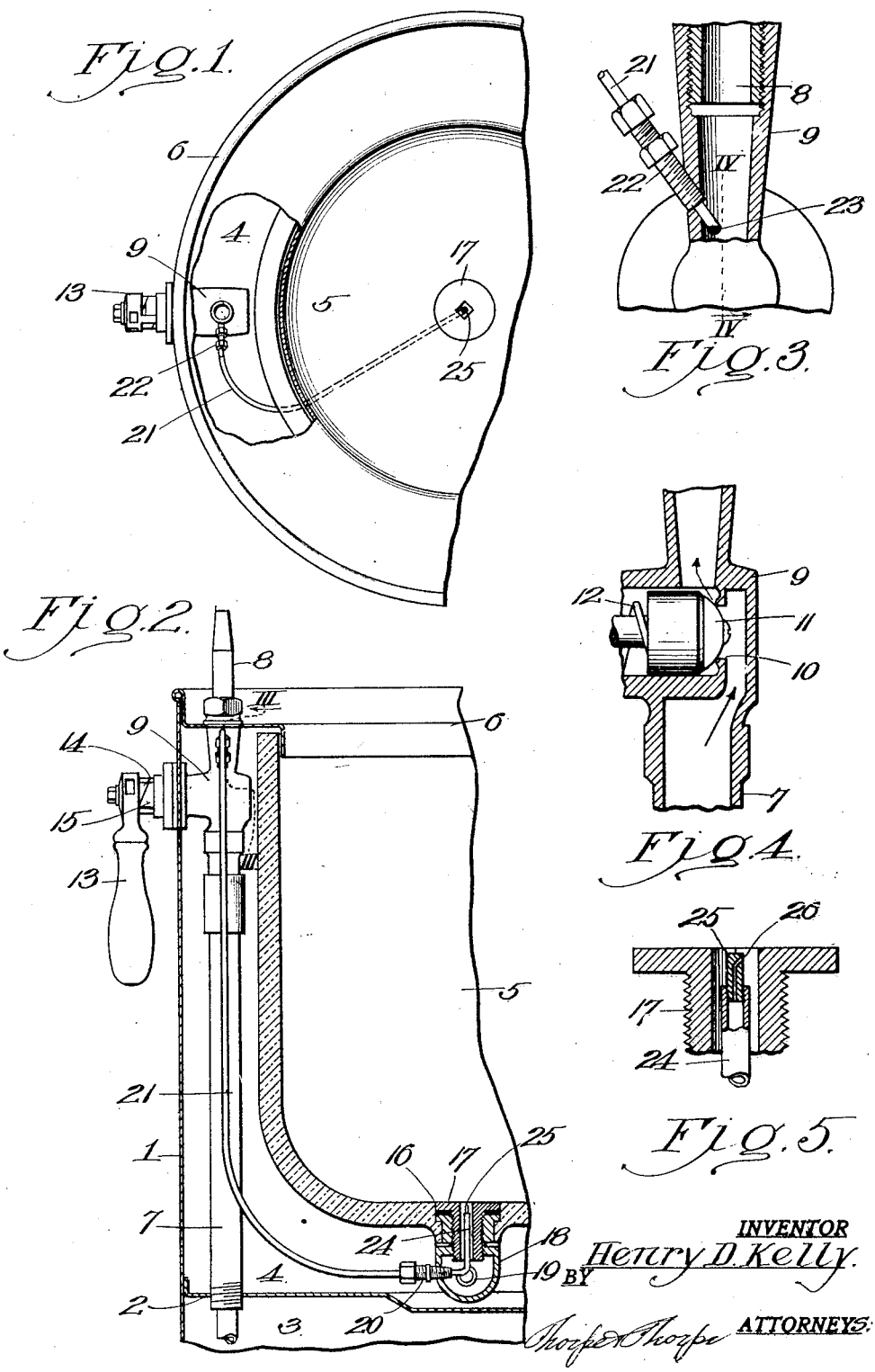

1,710,218

UNITED STATES PATENT OFFICE.

HENRY D. KELLY, OF KANSAS CITY, MISSOURI.

COFFEE URN.

Application filed December 12, 1927, Serial No. 239,418. Renewed February 25, 1929.

This invention relates to coffee urns for restaurant, hotel and like service, and more especially to urns of that type in which boiling water is discharged into ground coffee contained in a leacher bucket disposed above the beverage jar of the urn, the beverage produced by the action of the water on the coffee, filtering down into the jar.

In the production of coffee beverage in an urn of the character outlined, the first part of the beverage made is exceedingly strong and the last part very weak comparatively. The beverage in effect stratifies in the urn, the beverage in the lower part of the urn and hence that which is first delivered in drawing off through a faucet being objectionable because of its great strength, while the beverage drawn off when the supply is getting low is objectionable because it is too weak.

Accordingly it is a desideratum to have the beverage in the jar of uniform quality, and to accomplish this in the most expeditious, efficient and economical manner is my object. Heretofore I proposed means for injecting steam into the beverage to agitate or stir and hence mix it to uniform quality, and for reheating the beverage if desirable, but this method required occasional attention and manual operation on the part of an attendant, and if resorted to too often had a tendency to unduly weaken the beverage, especially after the quantity in the jar got low, and I also found that as urns of this character are usually equipped with burners under the boiler chamber, the heat generated was generally sufficient to avoid the necessity of reheating the beverage by injection of steam.

My object specifically is to effect a thorough mixture of the beverage in the jar as made, by discharging a thin spray of boiling water upwardly into the beverage simultaneously with the entrance of the latter to the jar from the leacher bucket, and by this method I have found that the beverage is uniform in quality and does not stratify.

With the object in view mentioned, the invention consists in certain novel and useful features of construction and combinations of parts as hereinafter described and claimed; and in order that it may be fully understood, reference is to be had to the accompanying drawing, in which:

Figure 1 is a fragmentary top view of a coffee urn embodying the invention, the cover and leacher bucket being omitted.

Figure 2 is a side view of the same with a wall of the urn in vertical section and the jar in central vertical section.

Figure 3 is an enlarged vertical section taken on the dotted line III—III of Figure 2.

Figure 4 is a vertical section taken at right angles to Figure 3 and on the line IV—IV thereof.

Figure 5 is an enlarged central section taken through a clamping tube fitted in the lower central portion of the jar and also showing the construction of the discharge end of the tube for supplying a jet of hot water to the beverage within the jar.

Referring now to the drawing in detail, 1 indicates the shell of the urn, and the same in this instance is divided by a horizontal partition 2 into a lower or boiler chamber 3 and an upper chamber 4, and suitably supported within the upper chamber is a beverage jar 5, centralized within the shell by an annular step-shaped ring 6 resting upon the upper end of the shell and depending into the jar so that the beverage from the overlying leacher bucket (not shown) shall all enter the jar.

A pipeway 7 is provided for conducting boiling water from the boiler chamber up to a fitting 8, upon which the pipe for supplying the boiling water to ground coffee in the leacher bucket, is adapted to be detachably fitted, said pipe and leacher bucket being omitted because conventional in this class of urns. The pipeway is equipped with a valve casing 9 having a valve seat 10 normally engaged by a compressible valve 11 ordinarily held by a spring 12 upon seat 10. A handle 13 is adapted to be turned to unseat the valve. Any suitable valve operating mechanism may be employed, but that shown includes a cam 14 on the handle for engaging a cam 15 rigid with the valve casing so that when the handle is turned it will withdraw the valve from its seat to permit boiling water to pass up through the pipeway and be eventually discharged into the ground coffee of the leacher bucket, from which it filtered as a beverage down into the jar, as hereinbefore mentioned.

As thus far described the urn is of conventional makeup, and it is also customary in such urns for the beverage to pass through an opening in the bottom of the jar into a conduit from which a pipe leads to the draw-off faucet, not shown. In this construction the jar is shown with a central stepped opening 16 in the bottom, and fitted in said opening and having a liquid tight joint connection with the jar is a tubular coupling 17, the coupling serving in this instance to communicate with and support the conduit 18 from which pipe 19 leads to the draw-off faucet mentioned. A fitting 20 is mounted on and extends into the conduit 18 and forms a support for a small tube 21 which extends radially outward under the jar and then upward at the side of the jar and terminates at its upper end in a downwardly sloping portion mounted in a fitting 22 screwed at a corresponding angle down into the valve casing 9 at a point above the valve therefor, and the end of the tube is covered by a fine wire or equivalent screen 23 to prevent the entrance of foreign particles in the tube and possibly clogging the passage thereof. The lower end of the tube terminates in an upwardly projecting portion 24 disposed within the passage of the coupling 17, and fitted in the upper end of said tube and terminating in the plane of or below the upper end of the coupling, is a plug 25 having a bore 26, the upper end of the bore sloping upwardly so that water may be discharged therefrom into the beverage without impedance by contact with the coupling.

From the foregoing it will be apparent that when valve 11 is unseated the pressure of steam within the boiler chamber will force water, as customary, up into the pipeway 7 and discharge it as explained into the leacher bucket, and it will be apparent that a minor flow of water will be forced up through the tube 21 and discharged under pressure into the jar through the bore 26 of plug 25, the discharges from above and below being simultaneous. It will be understood of course that the proportion of the minor flow through the tube, to the major flow through the leacher bucket, will be such that there shall be no undue dilution and weakening of the beverage by the minor flow. I have found from practical experimentation that a good proportion is about an ounce of water by the minor flow to a gallon by the major flow, though it will be understood that this ratio may be varied, and have also found that when the desired quantity of beverage has been made, it may be drawn off immediately through the draw-off faucet and will be found of good quality and strength and that the quality and strength of the entire volume is uniform, that is to say, the coffee served when the supply is nearly exhausted, is of practically the same quality and strength as that initially drawn off.

From the above description it will be apparent that I have produced a coffee urn embodying the feature of advantage set forth as desirable in the statement of the object of the invention, and that the present embodiment is to be considered as illustrative and not restrictive, as it may be changed in various details without departing from the spirit and scope of the appended claims.

I claim:

1. In a coffee urn, a shell having a boiling water chamber and another chamber, a pipeway for boiling water, a valve normally closing the pipeway passage, a beverage jar in the last-named chamber of the urn to receive coffee beverage and having an opening in the bottom, and a tube fitting at one end in the pipeway beyond the valve to receive a minor flow of boiling water when the valve is open, and communicating at its other end with the lower portion of the jar to discharge said minor flow of water into the jar.

2. A coffee urn, comprising a shell having a boiling water chamber and a chamber above the boiler chamber, a jar within the upper chamber, a pipeway extending upward from the boiler chamber to the other chamber, exterior to the jar, a valve controlling the pipeway at an intermediate point, and a small tube communicating at one end with the pipeway chamber beyond the valve and projecting upwardly at the other end and adapted at the last-named end to discharge a jet of water upwardly and laterally into the jar.

3. A coffee urn comprising a shell divided horizontally into a boiling water chamber and another chamber, a jar supported within the last-named chamber and provided with an opening at the bottom, a tubular coupling extending through said opening, a conduit communicating with the lower end of the tubular coupling and provided with a discharge pipe, a ring upon the shell and depending into the jar, a pipeway extending from the boiler chamber up through the other chamber exterior to the jar and through said ring, a valve casing on the pipeway below the ring, a yieldingly seated valve closing said valve casing, means for unseating the valve, fittings extending into the pipeway beyond the valve and into said conduit respectively, a tube extending through said fittings into the pipeway and conduit respectively and provided with a covering screen at its receiving end; the other end of the tube extending upwardly into said coupling, and a plug secured to the last-named end of the tube and disposed within the coupling passage and provided with a longitudinal bore extending angularly at its upper end to discharge a jet of water upwardly and laterally into the lower part of the jar.

4. The process of producing a coffee beverage, the same consisting in providing for a flow of boiling water under pressure, and in simultaneously directing a major flow of the water through a mass of ground coffee and a filtering means, into a beverage chamber, and a minor flow of the water directly into the beverage chamber to stir up or agitate the beverage as it accumulates in the beverage chamber so that the entire quantity of beverage shall be of uniform strength and quality.

5. The process of producing a coffee beverage, the same consisting in establishing a flow of boiling water and in dividing said flow of water into a major flow and a minor flow, the major flow of water passing to a beverage chamber after first passing through a mass of ground coffee and a filtering means, for transformation into coffee beverage, and the minor flow simultaneously jetting into the beverage chamber to agitate or stir the beverage therein until the supply of water ceases to flow.

In testimony whereof I affix my signature.

HENRY D. KELLY.